United States Patent [19]

Kuroda

[11] Patent Number: 5,329,366
[45] Date of Patent: Jul. 12, 1994

[54] TIME BASE CORRECTOR FOR VIDEO SIGNAL

[75] Inventor: Kazuo Kuroda, Tokorozawa, Japan

[73] Assignee: Pioneer Electronic Corporation, Tokyo, Japan

[21] Appl. No.: 988,482

[22] Filed: Dec. 10, 1992

[30] Foreign Application Priority Data

Dec. 19, 1991 [JP] Japan .................................. 3-337210

[51] Int. Cl.$^5$ ............................................. H04N 5/907
[52] U.S. Cl. .................................. 348/572; 360/36.2; 348/571
[58] Field of Search ...................... 358/21 R, 160, 149, 358/339; 340/799; 360/36.2; 345/200, 201; H04N 5/907

[56] References Cited

U.S. PATENT DOCUMENTS

| | | | |
|---|---|---|---|
| 4,065,787 | 12/1977 | Owen et al. | 358/160 |
| 4,445,135 | 4/1984 | Heitmann et al. | 358/149 |
| 4,775,899 | 10/1988 | Pasdera et al. | 360/36.2 |
| 4,862,269 | 8/1989 | Sonoda et al. | 358/160 |
| 4,975,788 | 12/1990 | Yamanishi | 360/36.2 |

Primary Examiner—Mark R. Powell
Assistant Examiner—Jeffrey S. Murrell
Attorney, Agent, or Firm—Kane, Dalsimer, Sullivan, Kurucz, Levy, Eisele and Richard

[57] ABSTRACT

A time base corrector includes a main memory, a sub memory, and a passing detection circuit for generating a passing detection signal on the basis of the frequency difference between a write reference signal and a read reference signal. A memory control circuit controls the main and sub memories so that a field image immediately prior to a field in which passing will occur is written into both the main and sub memories. The written field image is read out from the sub memory when the field in which passing will occur is processed. Alternatively, the memory control circuit performs switching between a normal mode and a slip mode on the basis of the passing detection signal. In the normal mode, only the main memory is used. In the slip mode, both the main memory and the sub memory are integrally used for writing and reading of the video image.

7 Claims, 10 Drawing Sheets

TIME BASE CORRECTOR FOR VIDEO SIGNAL

BACKGROUND OF THE INVENTION

1. Field of the Invention

The present invention generally relates to a time base corrector for video signal, and more particularly, to a time base corrector capable of converting an input video signal of lower frequency than that of a normal video signal into an output video signal of the normal frequency.

2. Description of the Prior Art

In a variable speed reproduction mode, such as a slow or quick mode, of a video signal reproducing apparatus, such as an LD, an image signal is reproduced in such a manner that track jump is performed so as to output an identical frame twice, or the reading skips over an intermediate frame. However, the above variable speed reproduction has a disadvantage in that a periodical abnormality of voice occurs because identical voice signals are successively output twice or an intermediate part of voice is skipped as in the case of the image signal.

A method using a field memory is known which is intended to eliminate the above disadvantage. This method uses a video memory having a storage capacity of at least one field. A variable speed video signal reproduced from a laser disk (LD) is written into the video memory in synchronism with a write clock corresponding to the frequency of the reproduced video signal, while the video signal written in the video memory is read out therefrom in synchronism with a read clock having a frequency of normal video signal. The structure of a memory unit of such a reproduction apparatus is illustrated in FIG. 1.

Figure 1:
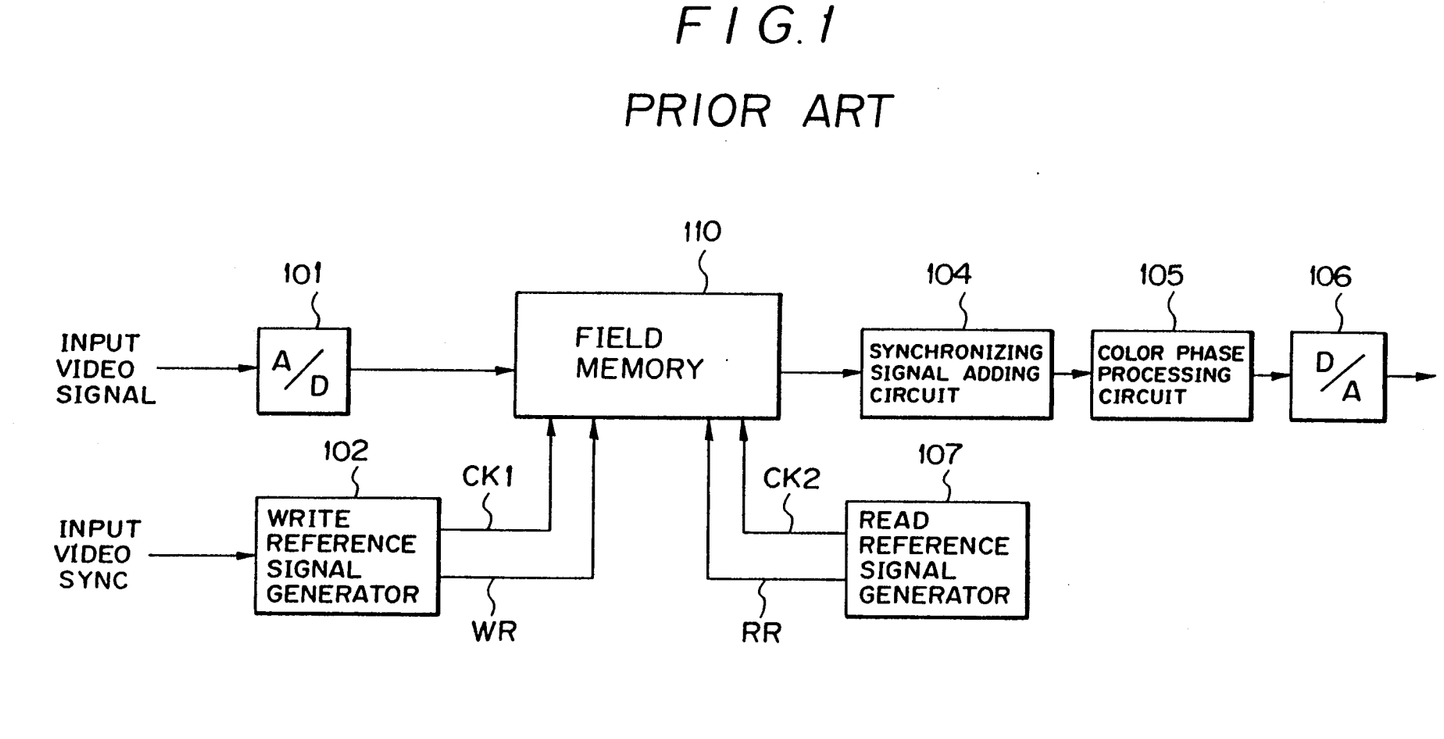
FIG. 1 is a block diagram of a time base corrector.

As shown in FIG. 1, the memory unit includes an A/D converter 101, a write reference signal generator 102, a field memory 110, a synchronizing signal adding circuit 104, a color phase processing circuit 105, a D/A converter 106, and a read reference signal generator 107. An input video signal has a frequency of a few percent higher or lower than the frequency of the normal video signal. This input video signal is converted to an analog video signal by the A/D converter 101, and is stored in the field memory 110. The field memory 110 has a storage capacity of at least one field. Image data is written into the field memory 110 on the basis of a write clock CK1 and a write reset signal WR. The write clock CK1 is generated by the write reference signal generator 102 and corresponds to the frequency of the input video signal. The written image data is read out from the field memory 110 in accordance with a read clock CK2 generated by the read reference signal generator 107 and a read reset signal RR. The read clock CK2 has a fixed frequency (14.3 MHz) of the normal video signal. The frequency of the read reset signal RR is determined in correspondence with the fixed frequency of the normal video signal. Hence, the video signal can be correctly reproduced.

A synchronizing signal is added to the signal read from the field memory 110 by the synchronizing signal adding circuit 104 and then subjected to a color phase processing by the color phase processing circuit 105. Then, the video signal with the synchronizing signal added thereto is converted into an analog video signal by the D/A converter 106.

In such a variable speed reproduction, there is a phenomenon called "passing". This is due to the fact that the frequency of the write clock of the video memory and the frequency of the read clock thereof differs from each other. When the frequency of the write clock is higher than that of the read clock, the time relation between the write clock and the read clock is reversed, and the write timing periodically passes (outruns) the reading timing. On the other hand, when the frequency of the write clock is lower than that of the read clock, the read timing periodically passes the write timing. When the frequency of the write clock is lower than that of the read clock, the following problem occurs in an image formed by the output video signal.

Figure 2:
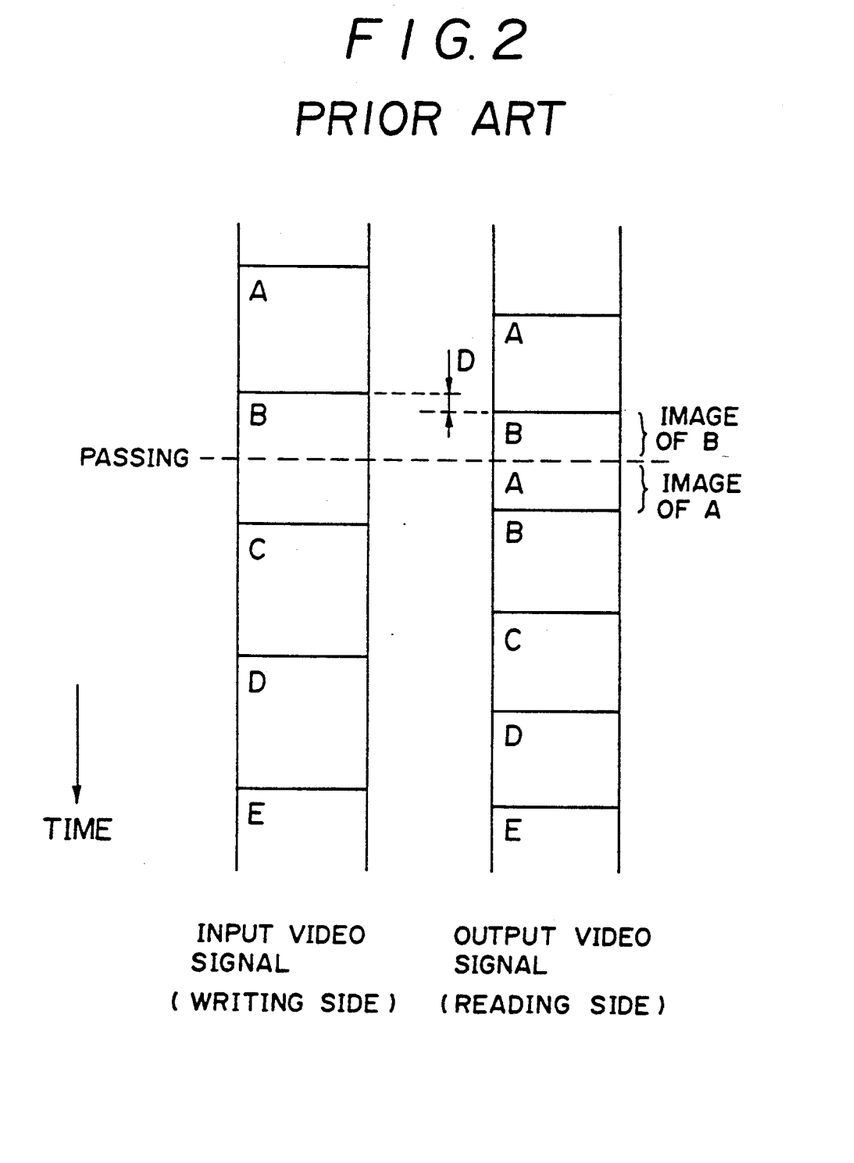
FIG. 2 is a diagram illustrating disadvantages of the time base corrector shown in FIG. 1.

In FIG. 2, field images A-E are shown. Since the frequency of the write clock is lower than that of the read clock, the read clock passes the write clock. If the read timing passes the write timing at a position indicated by a broken line shown in FIG. 2, there is no problem on the field image A because the write operation into the video memory has already completed. However, the passing takes place while the field image B is being written into the field memory, i.e., the timing of the broken line, and from then on, the read operation into the video memory precedes the write operation from the video memory. As a result, with respect to the field image B, the stored data in the video memory is read out before all data of the field image B is completely written into the video memory. Therefore, though the data read out from the video memory before passing (timing of the broken line) is the data of the field image B, the data read out from the video memory after the passing is the data of the field image A, i.e., the field image A is read again. As a result, the lower part of the field image B is replaced by the field image A, as shown in FIG. 2.

Figure 3:
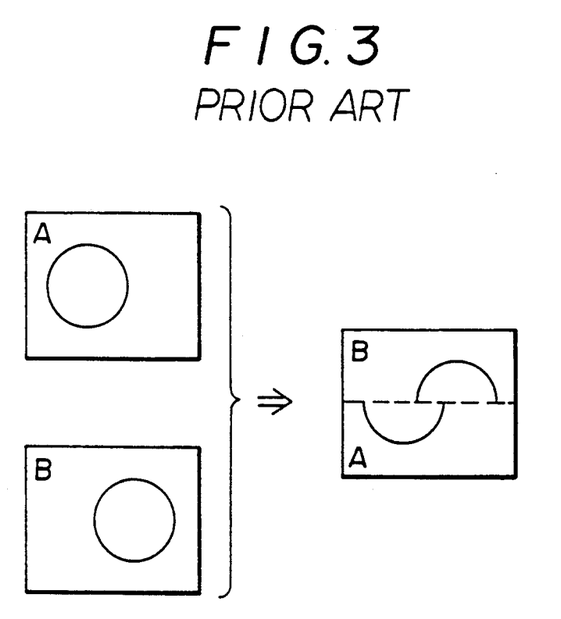
FIG. 3 is another diagram illustrating disadvantages of the time base corrector shown in FIG. 1.

As described above, when passing occurs, upper and lower parts of the field image become images of different fields. Actually, it is impossible to neglect the above problem if video image has a large or quick motion. For example, in a case of an image of an object moving from left to right at a relatively high speed, contents of the successive field images are considerably different. Hence, as shown in FIG. 3, image of the object cannot be correctly reproduced.

Figure 4:
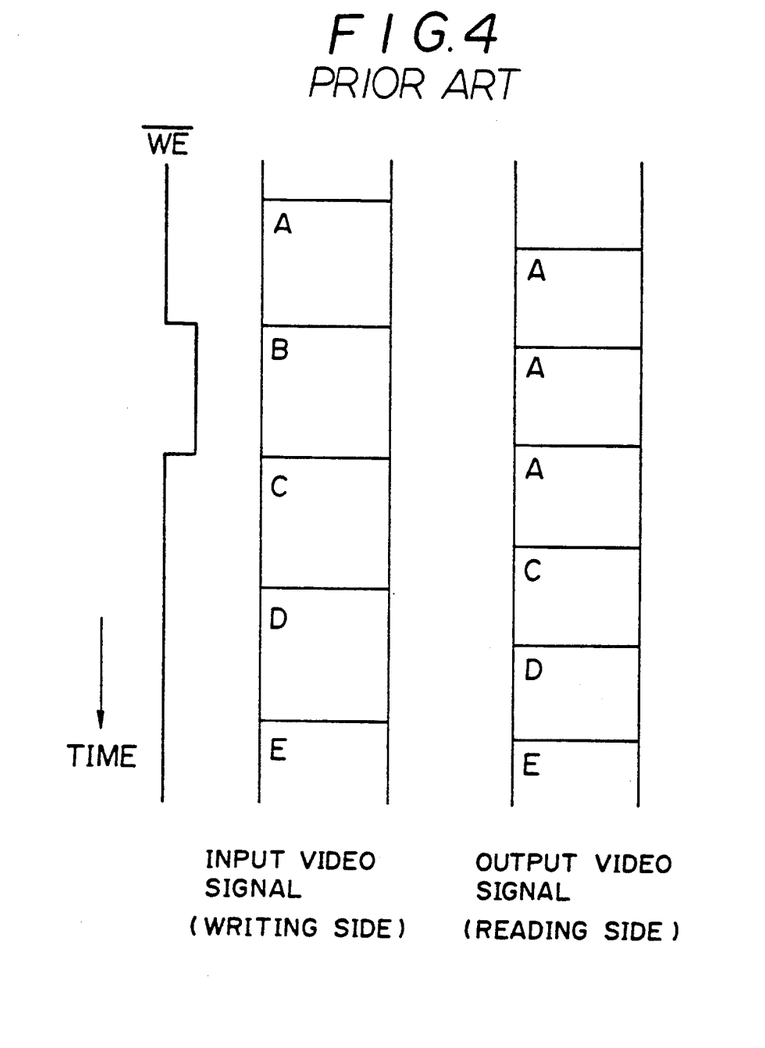
FIG. 4 is still another diagram illustrating the disadvantages of the time base corrector shown in FIG. 1.

In order to overcome the above problem, it may be possible to inhibit writing of a field image into the field memory when passing occurs, as shown in FIG. 4. However, since the field image B is not written into the field memory in this case, the field image A is repeatedly output for three times.

SUMMARY OF THE INVENTION

It is an object of the present invention to provide a time base corrector capable of reproducing a video signal which is little affected by the passing which occurs due to the difference of the write frequency and the read frequency.

According to one aspect of the present invention, there is provided a time base corrector for a video signal including, a main memory having a storage capacity of at least one field of video signal, a sub memory having a storage capacity of at least one field of video signal, write unit for writing an input video signal into at least one of the main memory and the sub memory in synchronism with a write reference signal which corresponds to a frequency of the input video signal, read unit for selectively reading out the written video signal from the main memory and the sub memory in synchronism with a read reference signal having a fixed frequency, passing detection unit for generating a passing detection signal on the basis of the frequency difference between the write reference signal and the read reference signal, and memory control unit for controlling reading of the video signal written in the main memory and the sub memory in accordance with the passing detection signal.

According to the present invention, the memory control unit controls the main and sub memories so that a field image immediately prior to a field in which passing will occur is written into both the main and sub memories. The written field image is read out from the sub memory when the field in which passing will occur is processed.

According to another aspect of the present invention, there is provided a time base corrector for a video signal having a first and a second operation modes including, a main memory having a storage capacity of at least one field of video signal, sub memory having a storage capacity less than the capacity of one field of video signal, write unit for writing an input video signal into the main memory and the sub memory in synchronism with a write reference signal which corresponds to a frequency of the input video signal, the write unit writing the input video signal into only the main memory in the first mode and writing the input video signal into both of the main memory and the sub memory in the second mode, read unit for reading out the written video signal from the main memory and the sub memory in synchronism with a read reference signal having a fixed frequency, the read unit reading the written video signal only from the main memory in the first mode and reading the written video signal from both of the main memory and the sub memory in the second mode, passing detection unit for generating a passing detection signal on the basis of the frequency difference between the write reference signal and the read reference signal, and control unit for changing the operation mode from the first mode to the second mode in response to the passing detection signal when the frequency of the write reference signal is lower than the frequency of the read reference signal.

According to the present invention, the control unit performs switching between the first mode and the second mode on the basis of the passing detection signal. In the first mode, only the main memory is used. In the second mode, both the main memory and the sub memory are integrally used for writing and reading of the video image.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

A description will now be given of a first embodiment of the present invention.

Figure 5:
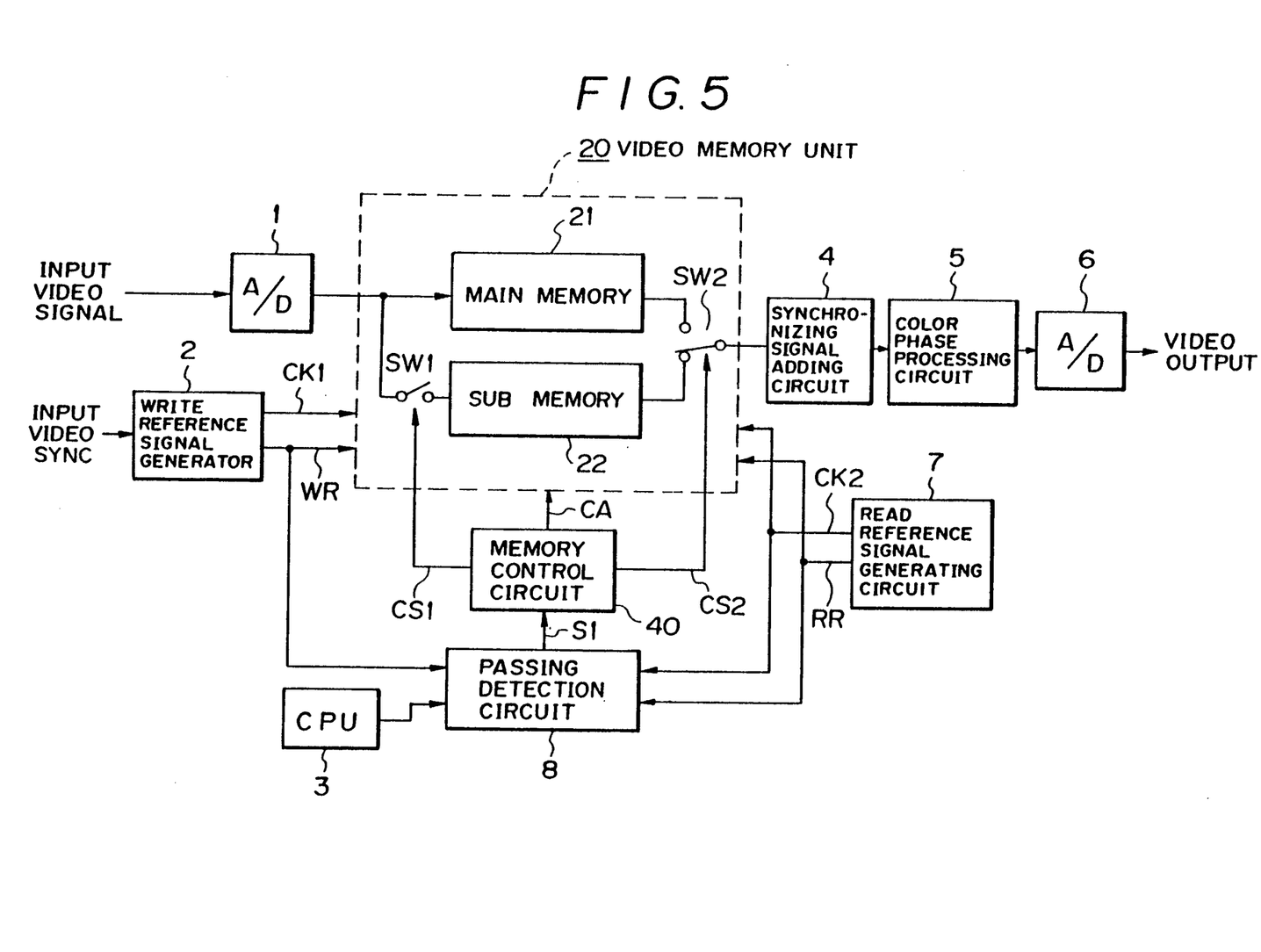
FIG. 5 is a block diagram showing a first embodiment of the present invention.

FIG. 5 shows the first embodiment of the present invention, which roughly includes a video signal processing block, and a control signal processing block. The video signal processing block includes an A/D converter 1, a video memory unit 20, a synchronizing signal adding circuit 4, a color phase processing circuit 5, and a D/A converter 6. The video memory unit 20 includes a main memory 21, a sub memory 22 and switches SW1 and SW2. The control signal processing block includes a write reference signal generator 2, a CPU 3, a read reference signal generating circuit 7, a passing detection circuit 8, and a memory control circuit 40. The video signal processing block operates in the same manner as the prior art shown in FIG. 1 except for the video memory unit 20, and hence a description thereof will be omitted. Each of the main memory 21 and the sub memory 22 in the video memory unit 20 have a storage capacity of at least for video image of one field. The switch SW1 connects the A/D converter 1 and the sub memory 22 to each other. The switch SW2 selectively connects either the main memory 21 or the sub memory 22 to the synchronizing signal adding circuit 4.

A description will now be given of the operation of the time base corrector shown in FIG. 5. The write reference signal generator 2 is supplied with a synchronizing signal separated from an input video signal, and outputs, to the video memory unit 20, write clock CK1 synchronized with the synchronizing signal and a write reset signal WR. Hence, the input video signal is written into the main memory 21 or both the main memory 21 and the sub memory 22 in synchronism with the write clock CK1 corresponding to the frequency of the input video signal. The read reference signal generating circuit 7 always outputs, to the video memory unit 20, a read clock CK2 of 14.3 MHz which corresponds to the frequency of the normal video signal and a read reset signal RR of approximately 60 Hz. Image data written in the memories 21 and 22 is read out therefrom via the switch SW2 in accordance with the read clock CK2 and the read reset signal RR. Hence, even when the frequency of the input video signal deviates from the frequency of the normal video signal, the video signal can be read from the video memory unit 20 at the frequency of the normal video signal. Therefore, the video signal output from the memory unit 20 has the frequency of normal video signal.

The CPU 3 calculates a setting value corresponding to the frequency of the input video signal, the setting value being applied to the passing detection circuit 8. Further, the passing detection circuit 8 is supplied with the write reset signal WR output from the write signal generator 2, the read clock CK2 and the read reset signal RR output from the read reference signal generating circuit 7. The passing detection circuit 8 detects passing, using the above input signals. For example, when the input video signal is 10 percent slower than the normal video signal (i.e., the frequency thereof is 10 percent lower than that of the normal video signal), since image signal of one field has 262.5 horizontal lines, the difference between the write reset signal WR and the read reset signal RR is reduced by approximately 26 lines (262.5×0.1) for every each field. With the above in mind, the number of horizontal lines is counted after the write reset signal WR is input to the passing detection circuit 8 until the read reset signal RR is input thereto (section D shown in FIG. 2). If the count value become equal to or smaller than 26, the passing will occur in the next field. Specifically, in this case, the setting value of the CPU 3 is set to 26, and the result of a comparison between the setting value and the number of horizontal lines is output, as a passing detection signal S1, to the passing detection circuit 8. Alternatively, it is possible to count the number of horizontal lines after the read reset signal RR is input to the passing detection circuit 8 until the write reset signal WR is input thereto. In this case, the setting value by the CPU 3 should be set to a value of (262.5-26).

Figure 6:
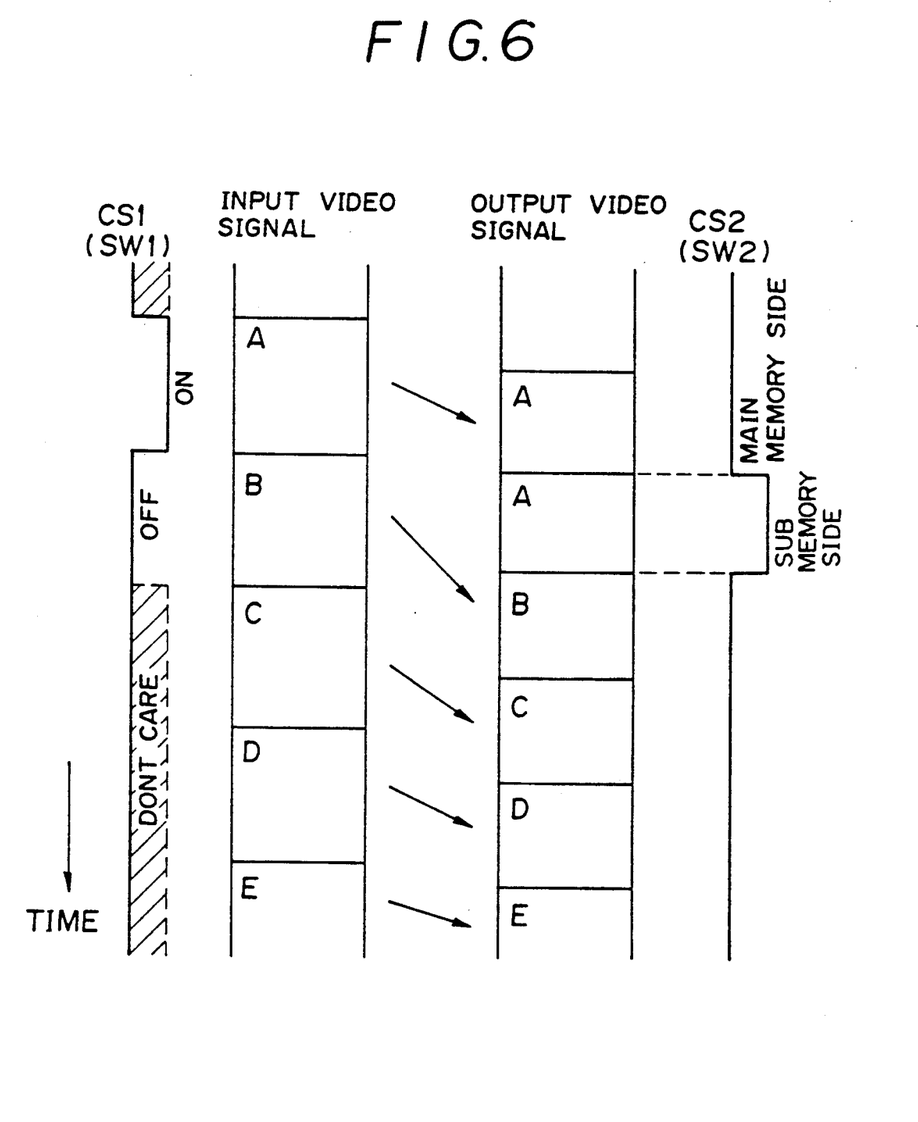
FIG. 6 is a diagram showing a memory control of the first embodiment of the present invention.

The passing detection circuit 8 detects a field in which passing will occur in the above-mentioned manner, and outputs the passing detection signal S1 to the memory control circuit 40. As shown in FIG. 6, the memory control circuit 40 carries out a write control such that the switch SW1 is turned ON by the control signal CS1 on the basis of the passing detection signal S1 so as to write the field image immediately prior to the field in which passing is expected to occur into both of the main memory 21 and the sub memory 22. The memory control circuit 40 also outputs an address control signal CA to the main memory 21 and the sub memory 22, and the input field image is written into a storage area specified by the address control signal CA. The switch SW1 should be turned ON for the period of the field image A and turned OFF for the period of the field image B, as shown in FIG. 6. The switch SW1 may be tuned either ON or OFF for the other periods. The memory control circuit 40 changes the switch SW2 by the control signal CS2 so as to execute such a read control that the field image written in the sub memory 22 is read out therefrom in the field in which passing will occur.

By repeating the above-mentioned control every time when the passing occurs, it becomes possible to eliminate the disadvantage that different field images are read out before and after the occurrence of passing.

A description will now be given of a second embodiment of the present invention. The second embodiment is intended to reduce the total storage capacity of the main memory 21 and the sub memory 22.

Figure 7:
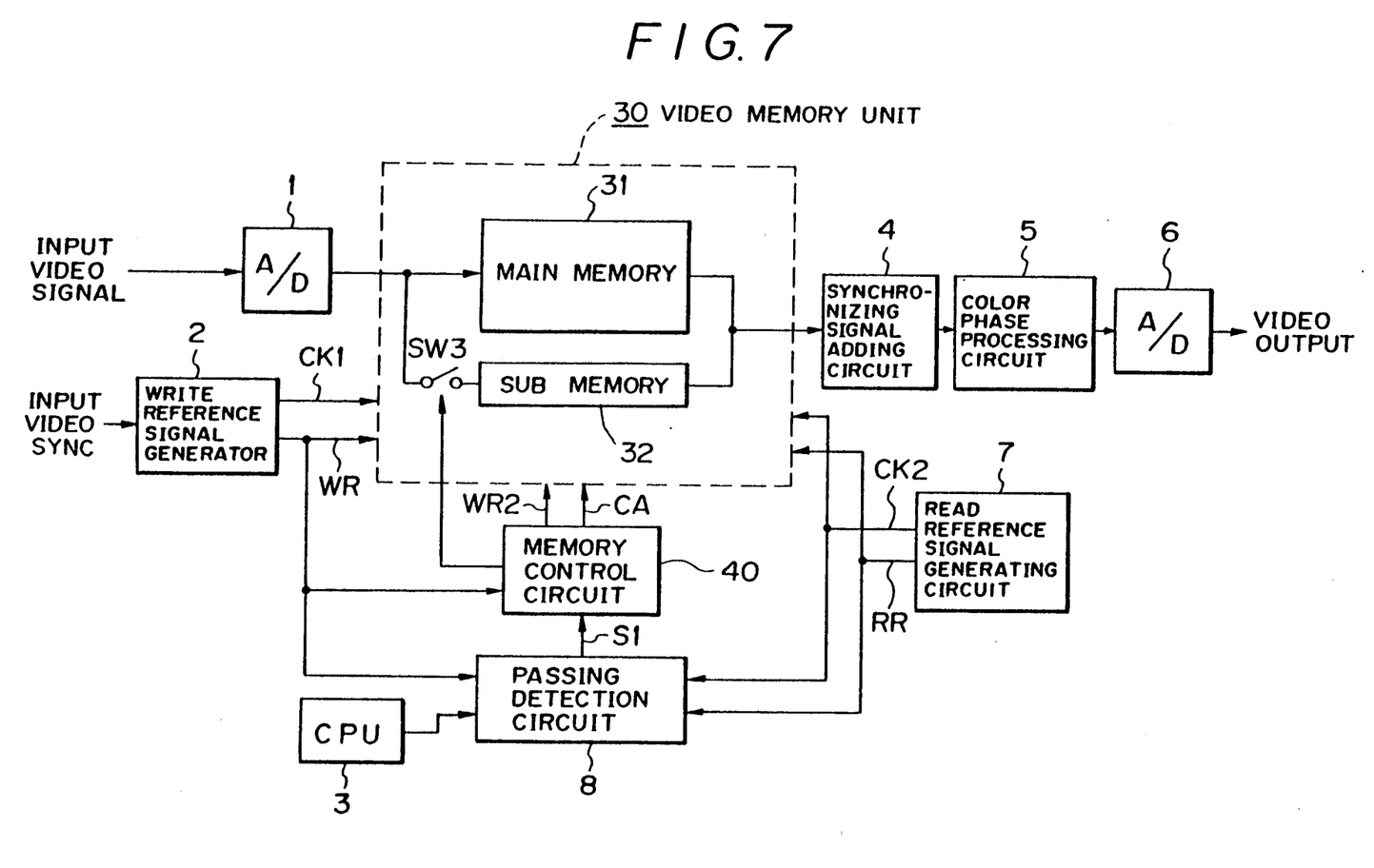
FIG. 7 is a block diagram showing a second embodiment of the present invention.

FIG. 7 shows the second embodiment of the present invention. The configuration shown in FIG. 7 differs from that shown in FIG. 5 in that a sub memory 32 shown in FIG. 7 has a less storage capacity than that of the sub memory 22 shown in FIG. 5, and that the write reset signal WR is supplied to the video memory unit 30 via the memory control circuit 40. Other parts of the second embodiment are identical to that of the first embodiment shown in FIG. 5, and accordingly the description will be omitted.

A main memory 31 of the video memory unit 30 is the same as the main memory 21 used in the first embodiment of the present invention, and has a storage capacity equal to at least one field of image data. On the other hand, the sub memory 32 has a storage capacity which is decided in accordance with the frequency (speed) of the input video signal. More particularly, the sub memory 32 has a sufficient storage capacity to store data corresponding to the difference between the speed of the input video signal (write reference signal) and the frequency of the normal video signal (read reference signal). If the frequency of the input video signal is 10 percent lower than the normal video signal, it is sufficient for the sub memory 22 to have storage capacity of at least 10 percent of the storage capacity for image data of one field. The following description will be given to the case in which the frequency of the input video signal is 10 percent lower than that of the normal video signal.

Referring to FIG. 7, the passing detection is performed in the same manner as that in the first embodiment, and the passing detection signal S1 is output to the memory control circuit 40. Then, the memory control circuit 40 executes switching between a normal mode and a slip mode on the basis of the passing detection signal S1.

Figure 8:
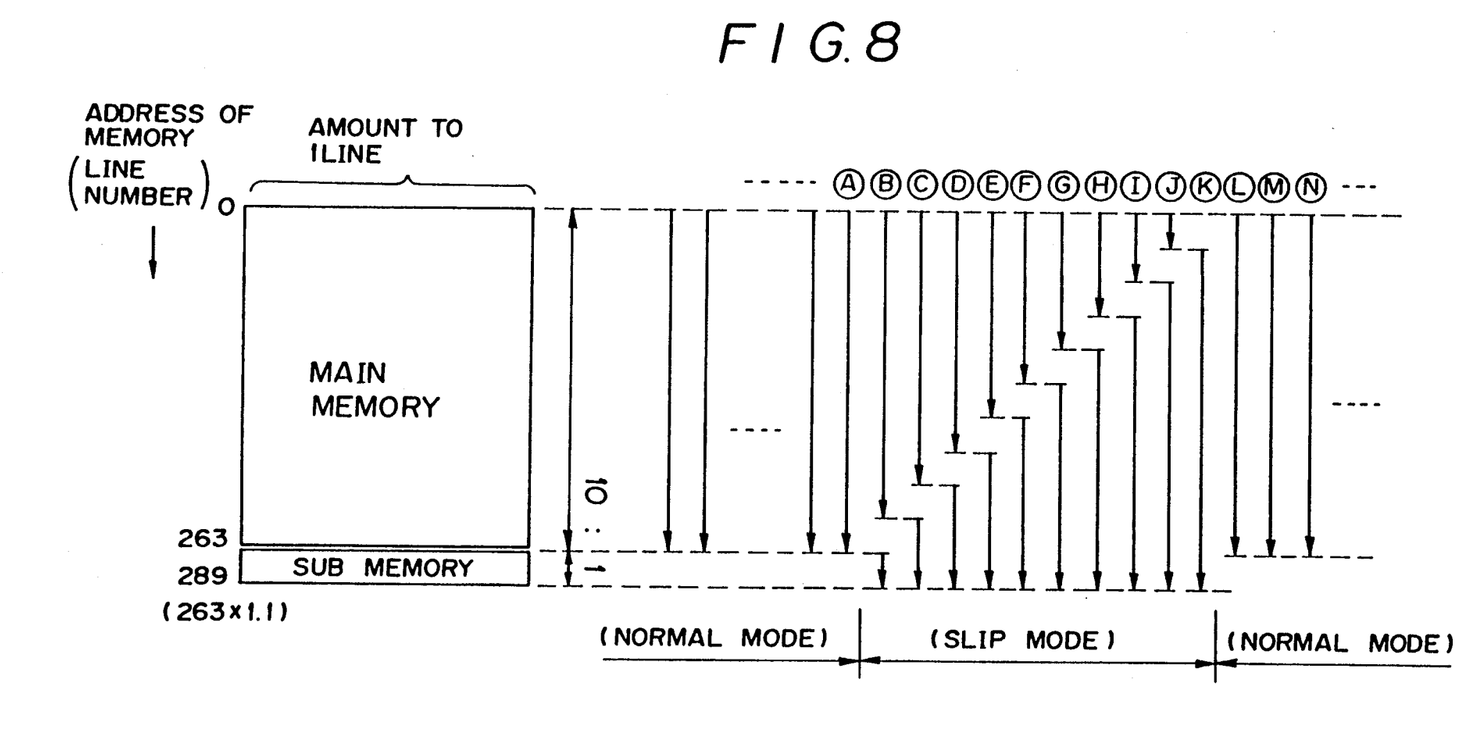
FIG. 8 is a diagram showing a memory control of the second embodiment of the present invention.

The normal mode corresponds to a state before the passing occurs, and only the main memory 31 in the video memory unit 30 is used in the normal mode. Hence, the switch SW3 is kept OFF in the normal mode. As shown in FIG. 8, image data of one field output from the A/D converter 1 is successively written into storage areas of the main memory 31 specified by predetermined addresses (0th-263th lines) in the normal mode, and are successively read out therefrom.

When the passing detection circuit 8 detects passing in the normal mode, the memory control circuit 40 switches the mode from the normal mode to the slip mode, and turns ON the switch SW3. At the same time, the memory control circuit 40 controls the write reset signal WR and the write address CA in the following manner.

In the slip mode, as shown in FIG. 8, the sub memory 32 having a storage capacity equal to 10 percent of the storage capacity of the main memory 31 is used together with the main memory 31. Hence, the total storage capacity of the video memory unit 30 has a storage capacity for 289 (263×1.1) horizontal lines of the video signal. In the slip mode, writing of the image data is not reset (terminated) at the storage area of 263th line, and image data is further written into the areas of the sub memory 32. Hence, as shown in FIG. 8, the data of the field image B is written into the sub memory 32 from the beginning storage area thereof (address for 264th line) to the end thereof (address for 289th line), and successively written into the main memory 31 from the beginning storage area (address for 0th line) thereof. Further, the data of the field image C is successively written into a storage area next to an storage area at which the writing of the field image B is completed. Similarly, data of the field image D and subsequent field images are written into the main memory 31 and the sub memory 32 in the manner shown in FIG. 8.

Figure 9:
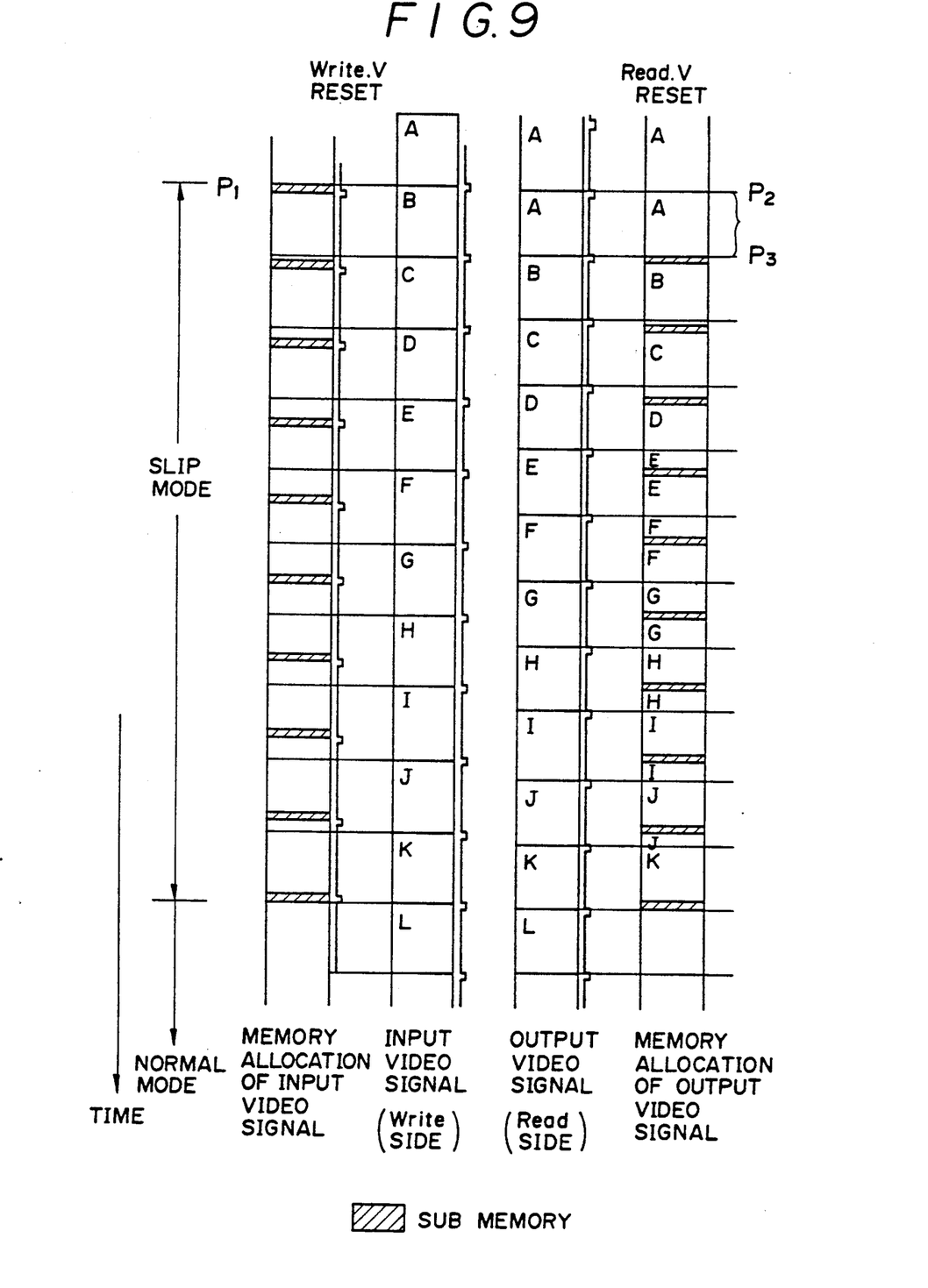
FIG. 9 is a diagram showing a memory allocation of the second embodiment of the present invention.

In this case, the storage areas of the main memory 31 and the sub memory 32 are allotted to the input and output video signals, as shown in FIG. 9. FIG. 9 shows a case where passing occurs within the 26 lines (part indicated by P1) from the uppermost part of the field image B of the input video signal. At the time when the passing occurs, the field image B is written into the sub memory 32. While the data of the field image B is written into the sub memory 32, the read address returns to the beginning (address for 0th line) of the memory 31 (point P2) so as to read out the data of the field image A once again (image between P2 and P3). Since the field image B has been written from the beginning of the sub memory 32 (address for 264th line) as shown in FIG. 8, the read operation is controlled so that the field image A is read again, the sub memory 32 is successively accessed to read out the data of the field image B, and then returns to the beginning of the main memory 31 to read out the rest of the data of the field image B. That is, the write address is changed in the manner as shown in FIG. 8. On the other hand, the read address is returned to the beginning position of the main memory 31 to read out the data of the field A once again and then changed in the same manner as the write address to read out the written data. Accordingly, it is possible to correctly read data of the field image B and following images. The write start address from which the writing starts is sequentially shifted as described above. When the write start address of the next field image returns to the beginning of the main memory 31 (i.e., field image L shown in FIGS. 8 and 9), the memory control circuit 40 switches the mode from the slip mode to the normal mode. From then on, address control of the normal mode is continued until the passing detection circuit 8 detects next passing.

According to the second embodiment of the present invention, since the write and read addresses are controlled in the above manner, the same advantages as the first embodiment is obtained with a memory of less capacity than that of the first embodiment.

Figure 10:
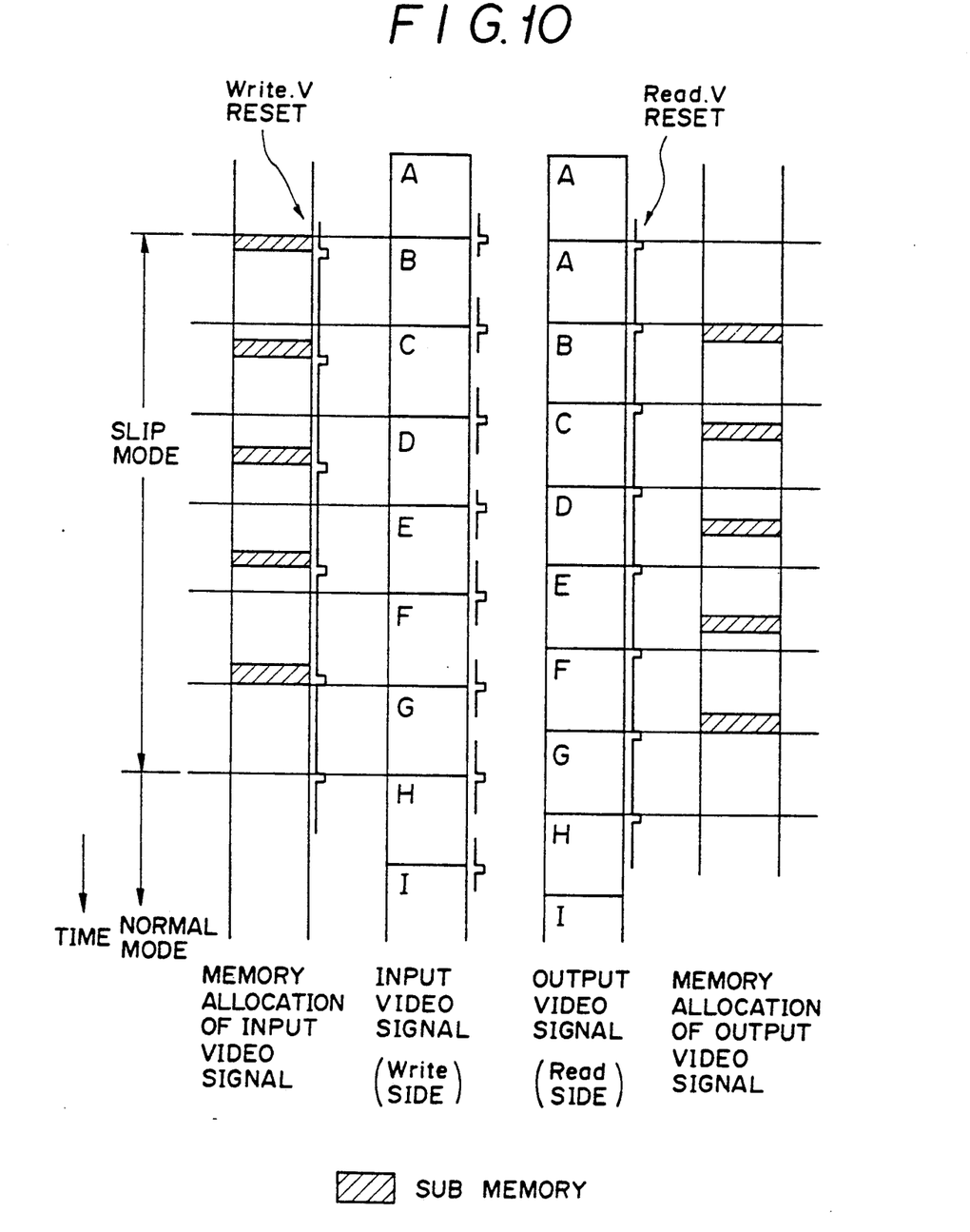
FIG. 10 is another diagram showing the memory allocation of the second embodiment of the present invention.

FIG. 10 shows a memory allocation in a case where the frequency of the input video signal is 10 percent less than that of the normal video signal, and accordingly the sub memory 32 has a storage capacity of 20 percent of that of the main memory 31. That is, since the sub memory 32 shown in FIG. 10 has a storage capacity twice of that of the sub memory 32 shown in FIG. 9, the time of the slip mode is half of that in FIG. 9.

In a case where the frequency of the input video signal varies, it is possible to cope with such variation by changing the storage capacity of the sub memory 32 in use in accordance with the quantity of the variation.

In practice, a video memory for PAL signal is available for the video memory unit 30 for the NTSC system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A time base corrector for a video signal comprising:

a main memory having a storage capacity of at least one field of video signal;

a sub memory having a storage capacity of at least one field of video signal;

write means for writing said video signal into at least one of the main memory and the sub memory in synchronism with a write reference signal which corresponds to a frequency of said input video signal;

read means for selectively reading out the written video signal from said main memory and the sub memory in synchronism with a read reference signal having a fixed frequency;

passing detection means for generating a passing detection signal on the basis of the frequency difference between the write reference signal and the read reference signal by comparing a read reset signal received from said read means with a write reset signal received from said write means; and memory control means for controlling reading of the video signal written in the main memory and the sub memory in accordance with said passing detection signal, wherein said memory control means permits said write means to write the video signal into the sub memory in response to receipt of the passing detection signal, and permits said read means to read out the written video signal from the main memory when a passing is not detected and from the sub memory for one field after receipt of a passing detection signal when the passing is detected.

2. A time base corrector for a video signal comprising:

a main memory having a storage capacity of at least one field of video signal;

a sub memory having a storage capacity of at least one field of video signal;

write means for writing said video signal into at least one of the main memory and the sub memory in synchronism with a write reference signal which corresponds to a frequency of said input video signal;

read means for selectively reading out the written video signal from said main memory and the sub memory in synchronism with a read reference signal having a fixed frequency;

passing detection means for generating a passing detection signal on the basis of the frequency difference between the write reference signal and the read reference signal by comparing a read reset signal received from said read means with a write reset signal received from said write means; and memory control means for controlling reading of the video signal written in the main memory and the sub memory in accordance with said passing detection signal, wherein said passing detecting means counts a time difference between the receipt of the write reference signal and the read reference signal, and generates the passing detection signal when said time difference exceeds a definite value determined in accordance with a frequency difference between the write reference signal and the read reference signal.

3. A time base corrector for a video signal comprising:

a main memory having a storage capacity of at least one field of video signal;

a sub memory having a storage capacity of at least one field of video signal;

write means for writing said video signal into at least one of the main memory and the sub memory in synchronism with a write reference signal which corresponds to a frequency of said input video signal;

read means for selectively reading out the written video signal from said main memory and the sub memory in synchronism with a read reference signal having a fixed frequency;

passing detection means for generating a passing detection signal based on the frequency difference between the write reference signal and the read reference signal by comparing a read reset signal received from said read means with a write reset signal received from said write means; and memory control means for controlling reading of the video signal written in the main memory and the sub memory in accordance with said passing detection signal, wherein said memory control means permits said write means to write the input video signal into both of the main memory and the sub memory in response to the receipt of the passing detection signal, and permits said read means to read out the written video signal from the sub memory for one field after the receipt of the passing detection signal.

4. A time base corrector for a video signal having a first and a second operation modes, comprising:

a main memory having a storage capacity of at least one field of video signal;

a sub memory having a storage capacity less than the capacity of one field of video signal;

write means for writing said video signal into the main memory and the sub memory in synchronism with a write reference signal which corresponds to a frequency of said input video signal, said write means writing the input video signal into only the main memory in the first mode and writing the input video signal into both of the main memory and the sub memory in the second mode;

read means for reading out the written video signal from the main memory and the sub memory in synchronism with a read reference signal having a fixed frequency, said read means reading the written video signal only from the main memory in the first mode and reading the written video signal from both of the main memory and the sub memory in the second mode;

passing detection means for generating a passing detection signal on the basis of the frequency difference between the write reference signal and the read reference signal by comparing a read reset signal received from said read means with a write reset signal received from said write means; and control means for changing the operation mode from the first mode to the second mode in response to the passing detection signal when the frequency of the write reference signal is lower than the frequency of the read reference signal.

5. A time base corrector according to claim 4, wherein said control means changes the operation mode from the second mode to the first mode when a write start address of the write means from which a next video signal is to be written becomes equal to a beginning address of the main memory.

6. A time base corrector according to claim 4, wherein said sub memory has a storage capacity at least for storing video signal corresponding to a ratio of the frequency difference between the write reference signal and the read reference signal to the read reference signal.

7. A time base corrector for a video signal according to claim 4, wherein said passing detecting means counts a time difference between the receipt of the write reference signal and the read reference signal and generates the passing detection signal when said time difference exceeds a definite value determined in accordance with a frequency difference between the write reference signal and the read reference signal.

* * * * *